Oct. 2, 1956
J. P. CLARK
2,764,833
FISHING LURE RETRIEVER
Filed July 8, 1955
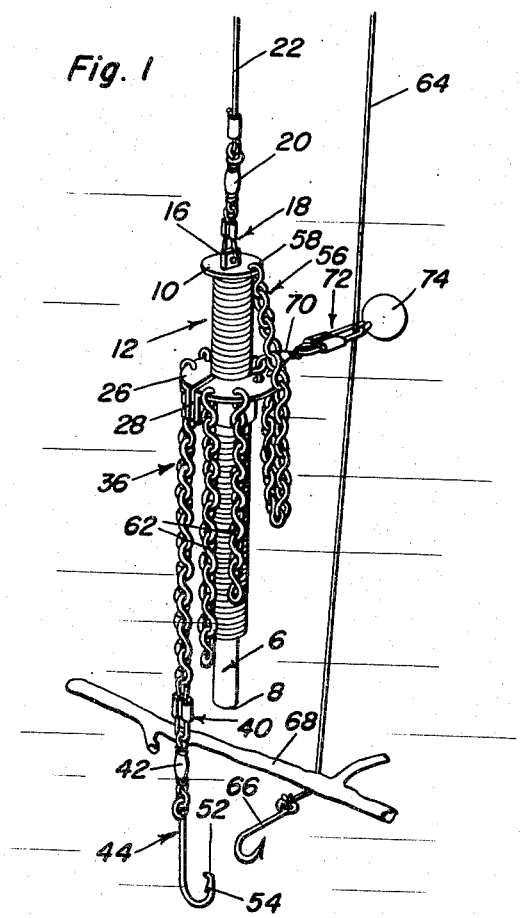
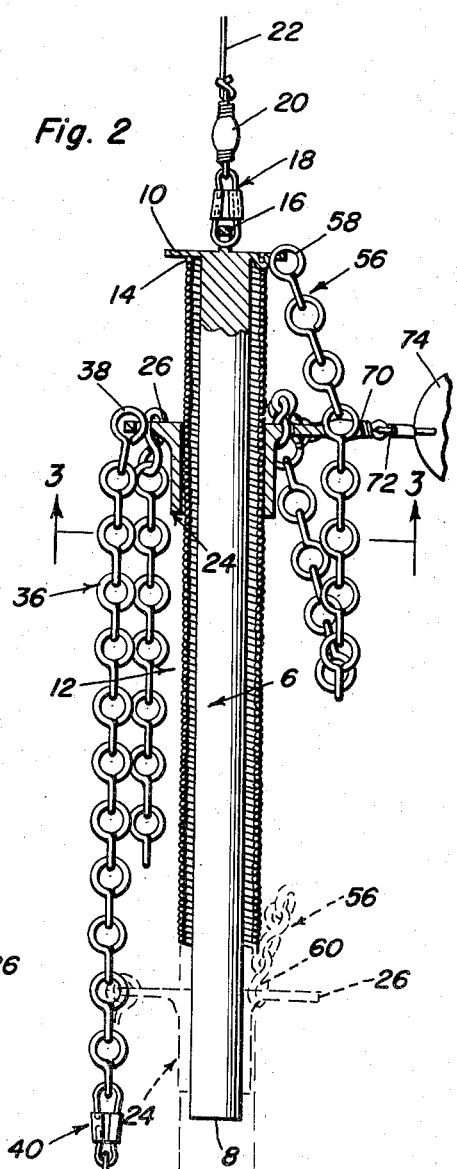
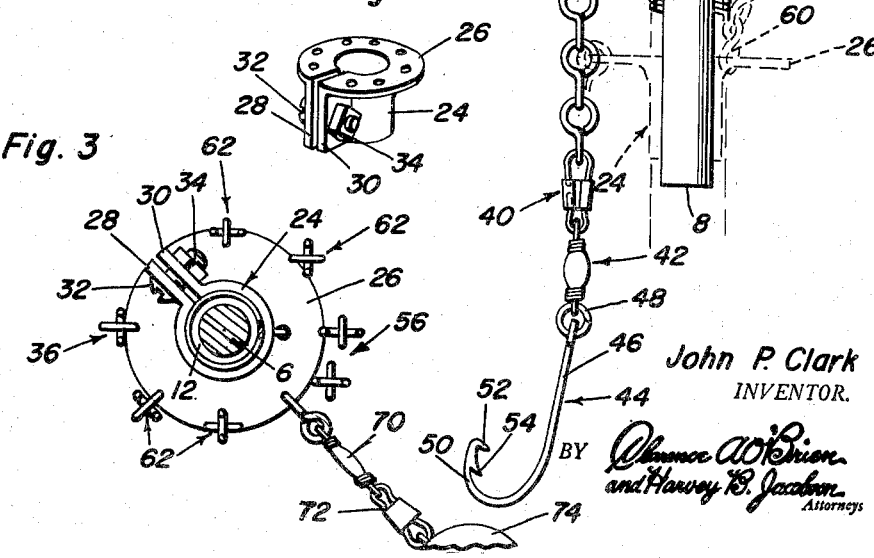
John P. Clark
INVENTOR.
BY *Clarence A. O'Brien*
*and Harvey B. Jacobson*
Attorneys

United States Patent Office 2,764,833
Patented Oct. 2, 1956

2,764,833

FISHING LURE RETRIEVER

John P. Clark, Winslow, Ariz.

Application July 8, 1955, Serial No. 520,737

9 Claims. (Cl. 43—17.2)

The present invention relates to a novel manually actuatable and controllable underwater retriever which is expressly and suitably constructed for loosening, dislodging and retrieving diversified movable objects such as fishing lures, lines and analogous angling equipment which may have become lodged under logs, rocks and the like in a now generally well known manner.

Another object of the invention is to promote and instill confidence in the fisherman to more or less invade and fish in debris laden areas where under ordinary circumstances an expensive plug, hooks and the like are likely to become snagged or otherwise fouled by assuring him that he has a good chance of retrieving such articles through the manageable and effective use of the retriever hereinafter disclosed.

The fact that recovering and salvaging present-day expensive fishing lures and equipment is now an approved practice makes it desirable to continue with all reasonable efforts to advance this art. It follows, therefore, that it is another object of the invention to provide a retriever which not only accomplishes the desired end results to best advantage but is an improvement in that chances of the retriever being lost along with the lost fishing equipment are reduced to a minimum. In fact, and conservatively estimated the retrieving of two or more fishing lures will effect a savings equal to about the amount of the cost of the herein revealed retriever.

In carrying out a preferred embodiment of the invention a simple, practical and economical structural device is employed. It is characterized by an elongate coil spring which is normally contracted, a projectible and retractible rigid ramlike plunger rod which is fixed at its upper end to the upper end portion of the spring and has its body portion passing downwardly through and beyond the lower end portion of said spring. A suitably weighted plunger lowering and hoisting line is swivelly connected at its lower end to the upper end of said rod. A split flanged collar encircles and is adjustably clamped on said spring. A normally slack chain is secured at one end of the plunger and at its opposite end to the flange on said collar, and a second chain is releasably connected at its upper end to the flange, there being a snap-fastener attached to the free lower end of said second chain, a swivel carried by said snap-fastener, and a suitably constructed grappling hook having a blunt-ended bill and shank portion which shank is joined to the swivel by way of a disruptible link which releases itself when abnormal strain is encountered.

Other objects, features and advantages will become more readily apparent from the following description and the accompanying sheet of illustrative drawing.

In the drawing, wherein like numerals are employed to designate like parts throughout the views.

Figure 1 is a perspective view of the improved retriever showing the manner in which it is used;

Figure 2 is a view in section and elevation with the details on a slightly enlarged scale and which also shows, in phantom lines, the mode of operation;

Figure 3 is a section on the line 3—3 of Figure 2; and

Figure 4 is a perspective view of the aforementioned collar.

Referring now to the drawing by way of reference numerals the ram-like projectible and retractible plunger is denoted by the numeral 6. This comprises an elongate cylindrical rod. The lower end 8 is preferably flat and is designed to impart a hammer-like blow in a manner to be later described.

The upper end of the plunger is provided with an integral flange 10 which may be treated as a head. The normally contracted coil spring 12 is of a suitable length preferably in proportion to that shown in Figure 2. This coil spring encases or surrounds the rod and the upper end 14 is suitably fixed to the flanged head. At the top of the head and centrally is an apertured lug 16 to which a conventional snap-fastener 18 is connected. There is a swivel 20 connected with the snap-fastener and this serves to accommodate the lower end portion of the suitably weighted retriever lowering and hoisting line 22. The numeral 24 designates a collar which encircles the coil spring and this has an outstanding flange 26. The collar may be said to be "split" and on opposite sides of the split portion are opposed radial flanges 28 and 30 which serve to accommodate a bolt 32 and an assembling and clamping nut 34. This flanged collar is thus adjustably mounted on the coil spring. It serves to accommodate a plurality of freely suspended flexible elements, preferably chains. One of these is denoted by the numeral 36 and the upper end thereof is connected by a frangible or so-called breakable link 38 to the apertured portion of the flange 26 as perhaps best shown in Figure 2. On the lower end portion there is a suitable snap-fastener 40 carrying a swivel 42 which serves to accommodate the grappling means. This is ordinarily what may be called a grapple hook 44. The shank 46 is connected to a strain release ring or link 48 which is in turn carried by the swivel 42. The curvate end or bill portion 50 has a blunt toed-in terminal 52 and, if desired, an associated barb 54. This hook means serves to trap or catch the object being fished for.

There is another normally slack chain and this is sometimes referred to as the second chain and it is here denoted by the numeral 56. It need not include any strain release or breakable link. It is preferably a strong chain and the upper end 58 is attached to the marginal portion of the flange 10. The opposite or lower end is attached at 60 to the flange 26. This is a limit or stop chain and serves to limit the downward movement of the collar and spring relative to the head or flange 10, as is borne out to some extent in Figure 2. The outer hanging chains may be called auxiliary chains and these are of different lengths and they are also carried by the flange 26 and may be used if and whenever desired. In some instances the fisherman may desire to have a series of grappling hooks at different distances so that they may be manipulated according to his skill, and the retrieving difficulties.

With reference to Figure 1 the numeral 64 designates a snagged fishing line. It is to be assumed for sake of illustration that this is provided with a conventional hook 66 which has become caught beneath a limb or the like 68. This line is used as a means for guiding the retriever to the desired spot. To accomplish this a swivel 70 is also connected with the aforementioned flange 26 and this carries a snap-fastener 72 which is slidably mounted on the fishing line. The snap-fastener carries a swivelly mounted ball 74.

It will be obvious that the retriever is operated by being attached to the fishing line by way of a snap-fastener 72, and assuming that the fishing line leads down to the object 66 which is to be retrieved it will be seen that by holding the fishing line taut and allowing the retriever to be lowered down by the mass and weight of the retriever plus that of the weighted line 22 the retrieving means will reach the spot desired. Upon contact with the fishing lure the retriever is jiggered or otherwise maneuvered several times to give the links of the chain 36 an opportunity to engage with the lost hook. By exerting tension on the lowering line it can be determined if an engagement has been effected, and then by the exertion of a slight pressure if said lures does not become disengaged, said lowering line is tensioned in the same same, which causes the plunger-ram to violently strike manner as a bow-string and immediately releasing the the submerged lure with a ram-like thrust which tends to dislodge the snagged lure. The lure, becoming disengaged, can be retrieved by winding up either the fishing line 64 or the line 22, or both.

The prime result is the retrieving of lures, plugs, baits, hooks and other equipment that have become snagged, caught or hung-up under water, thus effecting a financial saving to the fisherman by being able to retrieve fouled or snagged lures rather than breaking his line and losing said gear.

With further reference to the advantageous features of the invention it will be noted that the slack chain 56 so-called communicates pulling power after the plunger projecting spring has been extended. Secondly, if the retriever should become hopelessly ensnared it may be recovered by exerting sufficient pulling force to expand the weak link or links thus allowing the retriever to be freed with only the loss of one of the link chains, say the chains 36 or 62. In respect to the snap-on grapple assembly here again the safeguarding or frangible link connection is introduced. Reverting to the ball 74 this may be either metal or plastic and may be swivelled directly on the flange 26 or indirectly by way of the snap-fastener 72 as shown. The ball will be free to rotate and will thus effect forcing the fishing line out of a crack or crevis that it might have become lodged in. Time and again the fishing line becomes so snagged while the fishing lure itself remains free. Hence this line releasing feature is worthy of note. The blunt point or points 52 on the grapple hook minimize the likelihood that the hook might become stuck or lodged and interfere with its intended retrieving job.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalent may be resorted to, falling within the scope of the invention as claimed.

What is claimed as new is as follows:

1. An underwater retriever for loosening, dislodging and retrieving objects which are movable, but have lodged themselves under logs, rocks and the like comprising a projectible and retractible ram-like plunger the lower end of which may be aimed and alined with the object which is to be retrieved and salvaged, means for guiding and aiming the plunger, a lifting and lowering line attached to said plunger, a flexibly mounted grappling member carried by said plunger, and spring means co-operable with said plunger, said spring means comprising a coil spring encircling and encasing said plunger and being connected at its upper end to the upper end portion of said plunger, said flexibly mounted grappling member being fastened to said spring.

2. The structure defined in claim 1 and the combination therewith of a flexible limit control element attached to said plunger and mounting for said grappling member.

3. An underwater retriever for loosening, dislodging and retrieving objects which are movable, but have lodged themselves under logs, rocks and the like comprising a projectible and retractible ram-like plunger the lower end of which may be aimed and alined with the object which is to be retrieved and salvaged, means for temporarily attaching said plunger to a snagged fishing line in a manner that it may descend the fishing line to the trouble spot so that the lower impact end of the plunger may be aimed and set for reciprocating duty, a weighted plunger lowering and hoisting line swively attached at its lower end to said plunger, a coil spring encasing said plunger with its upper end fixed to the upper end of said plunger and its lower end free from positive connection with the plunger, a collar surrounding and carried by said coil spring, a flexible chain carried by said collar and freely swingable relative to said spring-encased plunger, the lower end of said chain being free and provided with means to catch hold of the object which is being fished for.

4. An underwater retriever for loosening, dislodging and retrieving objects which are movable, but have lodged themselves under logs, rocks and the like comprising a projectible and retractible ram-like plunger having a lower impact end which may be aimed and alined with the object which is to be retrieved and salvaged, means for temporarily attaching said plunger to a snagged fishing line in a manner to descend the fishing line to the trouble spot so that the lower impact end of the plunger may be aimed and set for reciprocating duty, a weighted plunger lowering and hoisting line swively attached at its lower end to said plunger, a coil spring encasing said plunger with its upper end fixed to the upper end of said plunger and its lower end free from positive connection with the plunger, a collar surrounding and carried by said coil spring, said collar having an outstanding flange, a first flexible chain connected at its upper end to said flange, the lower end of said chain being free and having a grapple hook connected thereto.

5. The structure defined in claim 4 and wherein said collar is adjustably mounted on said spring, and said hook having a blunt-ended bill portion.

6. An underwater retriever for loosening, dislodging and retrieving objects which are movable, but have lodged themselves under logs, rocks and the like comprising a projectible and retractible ram-like plunger having a lower impact end which may be aimed and alined with the object which is to be retrieved and salvaged, means for temporarily attaching said plunger to a snagged fishing line in a manner to descend the fishing line to the trouble spot so that the lower impact end of the plunger may be aimed and set for reciprocating duty, a weighted plunger lowering and hoisting line swively attached at its lower end to said plunger, a coil spring encasing said plunger with its upper end fixed to the upper end of said plunger and its lower end free from positive connection with the plunger, a collar surrounding and carried by said coil spring, said collar having an outstanding flange, a first flexible chain connected at its upper end to said flange, the lower end of said chain being free and having a grapple hook connected thereto, and a second flexible normally slack chain connected at its upper end to the upper end of said plunger and connected at its lower end to said flange.

7. The structure defined in claim 6 and wherein the upper end of the first chain is connected with said flange by way of a frangible stress-releasable link.

8. An underwater retriever for loosening, dislodging and retrieving objects which are movable, but have lodged themselves under logs, rocks and the like comprising an elongate coil spring normally contracted, a projectible and retractible rigid ram-like plunger rod fixed at its upper end to the upper portion of said spring and passing downwardly through and beyond the lower end portion of said spring, a weighted plunger lowering and hoisting line swively connected at its lower end to the upper end of said rod, a split flanged collar encircling and adjustably clamped on said spring, a normally slack chain secured at one end to said plunger rod and its other end to the flange on said collar, a second chain releasably connected at its upper end to the flange on said collar, the lower end of said second chain being free, a snap-fastener attached to said free lower end, a swivel carried by said snap-fastener, and a hook having a blunt-ended bill and a shank, the latter joined to said swivel by way of a disruptible link.

9. The structure defined in claim 8 and the combination therewith of a snap-fastener also connected with said flange at one end, the other end being free and having a ball swivelly attached thereto.

References Cited in the file of this patent

UNITED STATES PATENTS

| | | |
|---|---|---|
| 2,494,012 | Stricker | Jan. 10, 1950 |
| 2,594,852 | Bivens | Apr. 29, 1952 |